(12) United States Patent
Li et al.

(10) Patent No.: US 9,363,827 B2
(45) Date of Patent: Jun. 7, 2016

(54) VEHICLE GATEWAY ACCESS IN CELLULAR NETWORK FOR VEHICLE COMMUNICATIONS

(75) Inventors: Zhenhong Li, Shanghai (CN); Wei Zou, Shanghai (CN); Haifeng Wang, Shanghai (CN); Xianjun Feng, Shanghai (CN); Kenan Xu, Shanghai (CN)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/417,002

(22) PCT Filed: Jul. 23, 2012

(86) PCT No.: PCT/CN2012/079066
§ 371 (c)(1),
(2), (4) Date: Jan. 23, 2015

(87) PCT Pub. No.: WO2014/015470
PCT Pub. Date: Jan. 30, 2014

(65) Prior Publication Data
US 2015/0282210 A1    Oct. 1, 2015

(51) Int. Cl.
| | |
|---|---|
| *H04W 74/00* | (2009.01) |
| *H04L 29/08* | (2006.01) |
| *H04W 36/00* | (2009.01) |
| *H04W 36/30* | (2009.01) |
| *H04W 72/04* | (2009.01) |
| *H04W 74/08* | (2009.01) |
| *H04W 76/02* | (2009.01) |
| *H04W 76/04* | (2009.01) |
| *H04W 84/00* | (2009.01) |
| *H04W 88/08* | (2009.01) |
| *H04W 88/16* | (2009.01) |

(52) U.S. Cl.
CPC .............. *H04W 74/004* (2013.01); *H04L 67/12* (2013.01); *H04W 36/0016* (2013.01); *H04W 36/30* (2013.01); *H04W 72/0446* (2013.01); *H04W 74/0833* (2013.01); *H04W 76/023* (2013.01); *H04W 76/046* (2013.01); *H04W 84/005* (2013.01); *H04W 88/08* (2013.01); *H04W 88/16* (2013.01)

(58) Field of Classification Search
CPC ..................... H04W 74/0833; H04W 72/0406; H04W 74/08
USPC ........ 455/404.1, 436, 437, 450; 370/328, 329
See application file for complete search history.

(56) References Cited

U.S. PATENT DOCUMENTS

| | | | |
|---|---|---|---|
| 2010/0309836 A1 | 12/2010 | Sugawara et al. | |
| 2012/0069788 A1 | 3/2012 | Shen et al. | |

FOREIGN PATENT DOCUMENTS

| | | |
|---|---|---|
| CN | 102088793 | 6/2011 |
| EP | 2 239 968 | 10/2010 |
| EP | 2 429 252 | 3/2012 |

OTHER PUBLICATIONS

International Search Report Issued Apr. 18, 2013 In PCT/CN12/079066 Filed Jul. 23, 2012.

*Primary Examiner* — Sam Bhattacharya
(74) *Attorney, Agent, or Firm* — Oblon, McClelland, Maier & Neustadt, L.L.P

(57) ABSTRACT

The present invention addresses a method, apparatus and computer program product for vehicle gateway access in cellular network for vehicle communications. A dedicated Vehicle gateway random preamble is defined to serve the vehicle gateway access to the network in order to resolve the contention during the initial access and thus decrease access latency. In addition to that, a new cause value Vehicle gateway originated data/signaling for the RRC connection establishment request is defined to inform the network that the coming data traffic is from the vehicle communication.

20 Claims, 8 Drawing Sheets

| Information Elements | |
|---|---|
| UE Identity | CHOICE |
| | S-TMSI |
| | Random Value |
| Establishment Cause | CHOICE |
| | Emergency |
| | High Priority Access |
| | Mobile Terminating Access |
| | Mobile Originating Signalling |
| | Mobile Originating Data |

VEHICLE GATEWAY ACCESS IN CELLULAR NETWORK FOR VEHICLE COMMUNICATIONS

FIELD OF THE INVENTION

The present invention generally relates to enhancements on vehicle gateway access in cellular network for vehicle communications. More particularly, the present invention addresses an apparatus, method and computer program product for vehicle gateway access in cellular network for vehicle communications.

BACKGROUND

The automotive industry is moving aggressively in the direction of advanced active safety. Dedicated Short-Range Communication DSRC is a key enabling technology for the next generation of communication-based safety applications. Vehicle networks enable vehicles to communicate either with Road Side Units (RSU), in what is widely known as vehicle-to-infrastructure V2I communication, or among themselves, through vehicle-to-vehicle V2V communication. Wireless Access in Vehicular Environment WAVE is the core part of DSRC, which includes the suite of IEEE 1609.4 standards [1] family and IEEE 802.11p [2] that is built over IEEE 802.11 through amending many tweaks to guarantee and facilitate the provision of fast and reliable wireless access in vehicle networks. WAVE is the core part of DSRC; however, either of the two terms is commonly used arbitrarily. In some cases, the term DSRC is used as a more general term compared to WAVE.

As such, DSRC is currently considered the most promising wireless communication in vehicular network. However, DSRC must operate in rigorous and challenging environments which still require fast communication to maintain the connection with speeding vehicles at all times, strict Quality of Service QoS committed to predefined threshold delays for safety messages, minimal use of transmission power, and maintaining privacy and anonymity of roaming users etc.

Recent research in wireless vehicle networking has been focusing upon the heterogeneous integration of IEEE 802.11-based wireless ad-hoc networks with 3GPP cellular networks. Among the available technologies, the leading examples are the widely-deployed 3G/4G cellular networks and IEEE 802.11 based DSRC technology. 3G/4G technologies, such as UMTS or LTE, are predominantly used for wide-area wireless data and voice services via access to a base station BS/eNB. On the other hand, DSRC is used for short-range, high-speed communication among nearby vehicles and between vehicles and RSU. By integrating vehicular Ad Hoc network VANET with cellular, high data rate from IEEE 802.11P can be coupled with wide-range of communication. In the envisioned integrated network, if one vehicle is connected to the cellular network, it can serve as a gateway node for other vehicles in its vicinity to access the cellular network.

In most of the existing literature for vehicle communications, gateways (referred to RSU (Road Side Unit) sometimes) are considered static, deployed on the roadside at the fixed distance from each other, depending on their transmission range, which makes the overall system deployment costly. According to certain embodiments of the present invention as described in detail below, a mobile gateway refers to the dual-interfaced vehicle that relays the data from other vehicle sources to the LTE backhaul network. The dual interfaces are IEEE 802.11P and LTE. And this vehicle mobile gateway serves the vehicles in the cluster for the controlling signaling and forwarding the data under the assistance of the cellular network.

In the 3GPP scenario [3], the Machine Type Communication MTC Gateway device is a kind of MTC device that has 3GPP mobile communication capability. The devices located at the MTC capillary network do not have 3GPP mobile communication capability, i.e. they are local-access devices. They are connected to the MTC gateway device via local connectivity technologies such as IEEE 802.15, Zigbee, Bluetooth etc. Comparing with the above scenario, we can think that the vehicle mobile gateway as the MTC gateway device and local-access device as the vehicles with the IEEE 802.11P capability. And vehicle mobile gateway communicates with vehicles via local area interface (e.g. IEEE 802.11P); Vehicle mobile gateway communicates with the cellular network via LTE interfaces.

A prominent issue in the vehicle and cellular integrated networks revolves around the fast access and gateway management of the vehicular gateways.

For the integrated vehicle and cellular communications, most of the existing research focuses on the clustering, i.e., how to form the cluster and how to maintain/update the cluster during the movement. As the vehicle GW may need to report the central network on the safety applications, traffic management etc instantly, fast access to the cellular link for vehicle GW is another important issue for vehicle and cellular integrated communications which has not yet been studied in the literature.

Hence, there is still space for optimizing fast access and handover in terms of the RRC connection and handover procedure.

REFERENCES

[1] IEEE Trial-Use Standard for Wireless Access in Vehicular Environments (WAVE)—Multi-channel Operation, IEEE Std 1609.4™-2006
[2] Part 11: Wireless Medium Access Control (MAC) and Physical Layer Specifications, IEEE Std 802.11P™—2006
[3] 3GPP TR23.888, System Improvements for Machine-Type Communications, 2010-07, V1.0.0.
[4] 3GPP TS36.331, Radio Resource Control Protocol Specification, 2010-10, V10.0.0
[5] 3GPP TS22.011, Service Accessibility, 2011-03, V10.3.0.
[6] 3GPP TS36.211, Physical Channels and Modulations, 2011-12, 10.4.0.

SUMMARY OF THE INVENTION

It is an object of the present invention to address the above problems. In particular, it is an object of the present invention to provide an apparatus, a method and a computer program product for enabling enhanced vehicle gateway access in cellular network for vehicle communications.

According to a first aspect of the present invention, an apparatus comprises at least one processor and at least one memory including computer program code, the at least one memory and the computer program code configured to, with the at least one processor, cause the apparatus at least to perform determining whether a received random access preamble is assigned to a preset vehicle gateway random preamble group, causing transmission of a message comprising the identity of the of the received preamble, an initial uplink resource grant for connection establishment request and a temporary radio network temporary identifier to the network element, and, upon receiving a connection establishment request comprising a cause value for indicating a vehicle gateway communication from the network element, causing transmission of radio resource control connection setup information to the network element and allocating a resource for vehicle gateway communication.

According to a second aspect of the present invention, a method comprises the steps of determining whether a received random access preamble is assigned to a preset vehicle gateway random preamble group, causing transmission of a message comprising the identity of the of the received preamble, an initial uplink resource grant for connection establishment request and a temporary radio network temporary identifier to the network element, and, upon receiving a connection establishment request comprising a cause value for indicating a vehicle gateway communication from the network element, causing transmission of radio resource control connection setup information to the network element and allocating a resource for vehicle gateway communication.

According to a third aspect of the present invention, an apparatus comprises at least one processor, and at least one memory including computer program code, the at least one memory and the computer program code configured to, with the at least one processor, cause the apparatus at least to perform causing transmission of a random access preamble which is assigned to a preset vehicle gateway random preamble group to a base station, and, upon receiving a message comprising the identity of the of the transmitted preamble, an initial uplink resource grant for connection establishment request and a temporary radio network temporary identifier from the base station, causing a transmission of a connection establishment request comprising a cause value for indicating a vehicle gateway communication to the base station.

According to a fourth aspect of the present invention, a method comprises the steps of causing transmission of a random access preamble which is assigned to a preset vehicle gateway random preamble group to a base station, and, upon receiving a message comprising the identity of the of the transmitted preamble, an initial uplink resource grant for connection establishment request and a temporary radio network temporary identifier from the base station, causing a transmission of a connection establishment request comprising a cause value for indicating a vehicle gateway communication to the base station.

According to a fifth aspect of the present invention, there is provided a computer program product comprising computer-executable components which, when the program is run on a computer, are configured to carry out the method according to the second aspect and/or the method according to the fourth aspect.

According to a sixth aspect of the present invention, an apparatus, comprises determination means for determining whether a received random access preamble is assigned to a preset vehicle gateway random preamble group, transmission means for causing transmission of a message comprising the identity of the of the received preamble, an initial uplink resource grant for connection establishment request and a temporary radio network temporary identifier to the network element, and transmission means for causing transmission of radio resource control connection setup information to the network element and allocating a resource for vehicle gateway communication upon receiving a connection establishment request comprising a cause value for indicating a vehicle gateway communication from the network element.

According to a seventh aspect of the present invention, an apparatus comprises transmission means for causing transmission of a random access preamble which is assigned to a preset vehicle gateway random preamble group to a base station, and transmission means for causing a transmission of a connection establishment request comprising a cause value for indicating a vehicle gateway communication to the base station upon receiving a message comprising the identity of the of the transmitted preamble, an initial uplink resource grant for connection establishment request and a temporary radio network temporary identifier from the base station.

Advantageous further developments or modifications of the aforementioned exemplary aspects of the present invention are set out in the dependent claims.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

Figure 1:
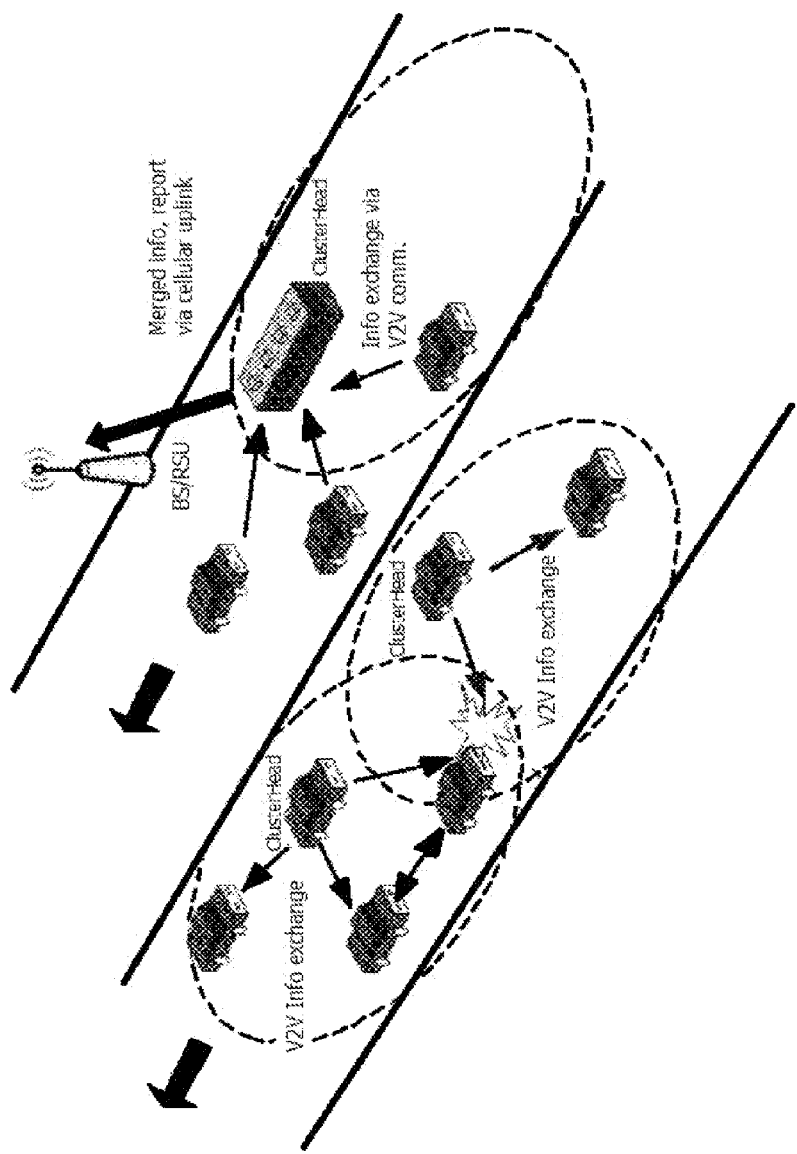
FIG. 1 shows a vehicle communication scenario.

In the scenario according FIG. 1, one vehicle acts as gateway for other vehicles and connects with a base station eNB/RSU via cellular link. And this Vehicle gateway GW communicates with other vehicles in the group via e.g. IEEE 802.11P interface or other feasible interfaces. The cluster is formed based on the similar vehicle characteristics, for example direction and velocity etc. The Vehicle GW has the responsibility to send application data of itself and its cluster members to the eNB via e.g. LTE link. All the vehicles equipped with the LTE transceiver and V2V communication technology (e.g., IEEE 802.11P) could be selected as the Vehicle GW. The Vehicle GW may aggregate data of cluster members before sending it to eNB.

In IEEE 802.11P (cf. [1]), nodes aiming to initialize an 802.11p Basic Service Set BSS are called providers; a WAVE provider could be either a RSU or a vehicle. Providers advertise their presence and the offered services by periodically broadcasting Wave service Advertisement WSA messages during the time interval where all vehicular nodes are tuned to the Control Channel CCH. WSAs contain all the information identifying the provided WAVE service and the network parameters necessary to join the BSS (e.g., the SCH frequency). Nodes interested in the services offered by the provider, namely WAVE users, should monitor the CCH listening for WSAs to learn about the existence and the operational parameters of available BSSs; then they simply switch on the advertised SCH frequency during the Shared Channel SCH interval to join the BSS. For the data traffic part, contention based CSMA mechanism applies. Though the join procedure for the node is pretty simple but the access time it somehow dependent on system load due to the potential contention. On the other hand, current LTE system only supports the scheduled MAC resource allocation method instead of the contention based MAC mechanism.

In the current Radio Resource Control RRC specification in 3GPP, the RRC Connection Request message is sent as part of the Random Access procedure (cf. [4]). RRC connection establishment is used to make the transition from RRC Idle mode to RRC Connected mode. UE must make the transition to RRC Connected mode before transferring any application data, or completing any signaling procedures. The RRC connection establishment procedure is always initiated by the UE but can be triggered by either the UE or the network. In the RRC connection establishment procedure specified in [4] includes three steps as illustrated in FIG. 2.

The RRC Connection Request is transferred using SRB 0 (Signaling Radio Bearer) on the Common Control Channel (CCCH) because neither SRB 1 nor a Dedicated Control Channel (DCCH) have been setup at this point. The uplink Resource Block allocation for the RRC Connection Request message is signaled within the Random Access Response message.

Figures 2, 3:
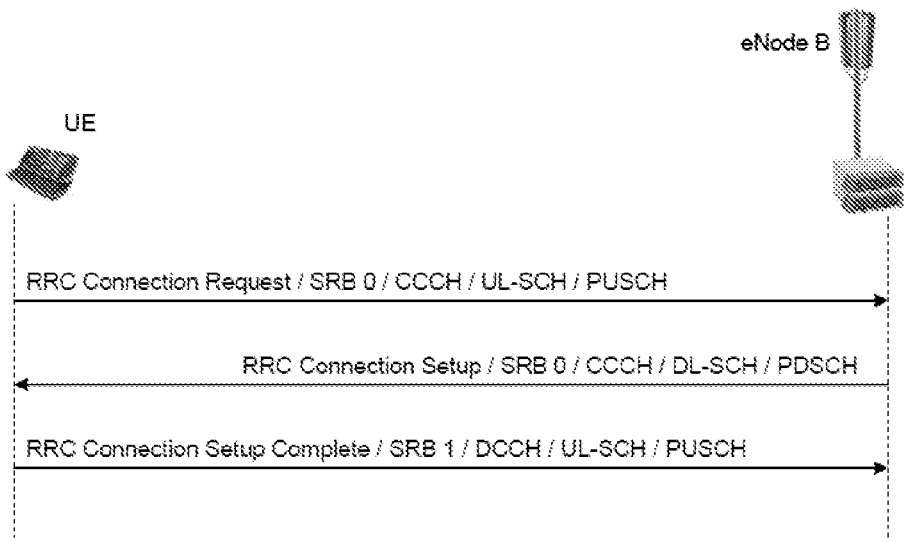
FIG. 2 shows a RRC connection establishment (successful)
FIG. 3 shows the content of RRC Connection Request message.

The content of the RRC Connection Request message is shown in FIG. 3. It includes a UE identity and an establishment cause. The UE identity is signaled using the SAE Temporary Mobile Subscriber Identity (S-TMSI) if the UE is registered with the Tracking Area to which the current cell belongs. The establishment cause within the RRC Connection Request message is determined by the Non-Access Stratum (NAS) procedure for which the connection is being established.

According to the current RRC specification, the cause value for the establishment is:
EstablishmentCause:=ENUMERATED {emergency, highPriorityAccess, mt-Access, mo-Signalling, mo-Data, delayTolerantAccess-v1020, spare2, spare1};

The HighPriorityAccess have already been defined for the emergency access or other Utilities service or security services etc in [5].

There are still two spares for the further development and certainly the vehicle communication/vehicle gateway communication has not yet been taken into account yet in the current specification through the vehicle gateway communication has been gained popular attraction for a while.

In order to enable the fast access to the network during the initial access and during the intra-EUTRA handover, an enhanced RRC connection setup and handover procedures are proposed for the vehicle gateway communication.

Figure 4:
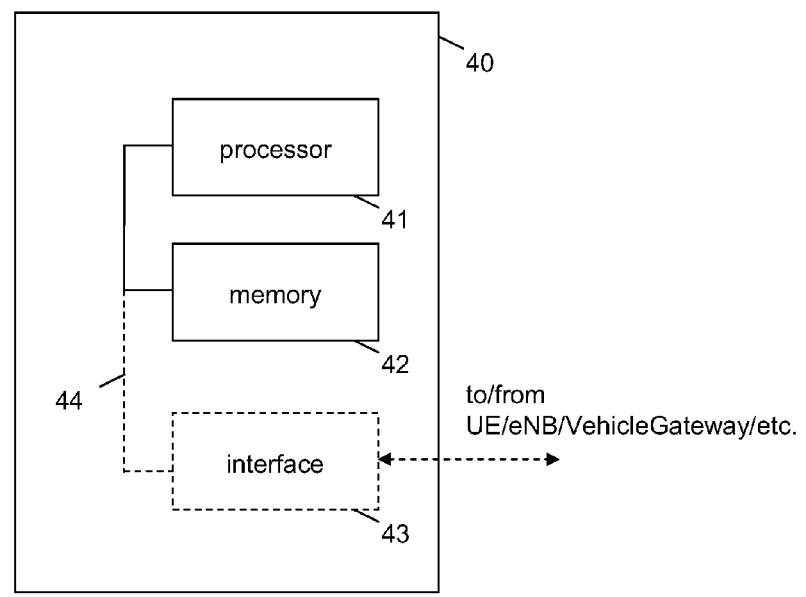
FIG. 4 shows a principle configuration of an example for an apparatus according to certain embodiments of the present invention.

FIG. 4 shows a principle configuration of an example for an apparatus according to certain embodiments of the present invention. The apparatus 40 comprises at least one processor 41 and at least one memory 42 including computer program code, which are connected by a bus 44 or the like. As indicated with a dashed line in FIG. 2, an interface 43 may optionally be connected to the bus 24 or the like, which may enable communication e.g. to/from a network entity, a base station, a UE, a vehicle gateway or the like. The at least one memory and the computer program code are arranged to, with the at least one processor, cause the apparatus at least to perform determining whether a received random access preamble is assigned to a preset vehicle gateway random preamble group, causing transmission of a message comprising the identity of the of the received preamble, an initial uplink resource grant for connection establishment request and a temporary radio network temporary identifier to the network element, and, upon receiving a connection establishment request comprising a cause value for indicating a vehicle gateway communication from the network element, causing transmission of radio resource control connection setup information to the network element and allocating a resource for vehicle gateway communication.

Figure 5:
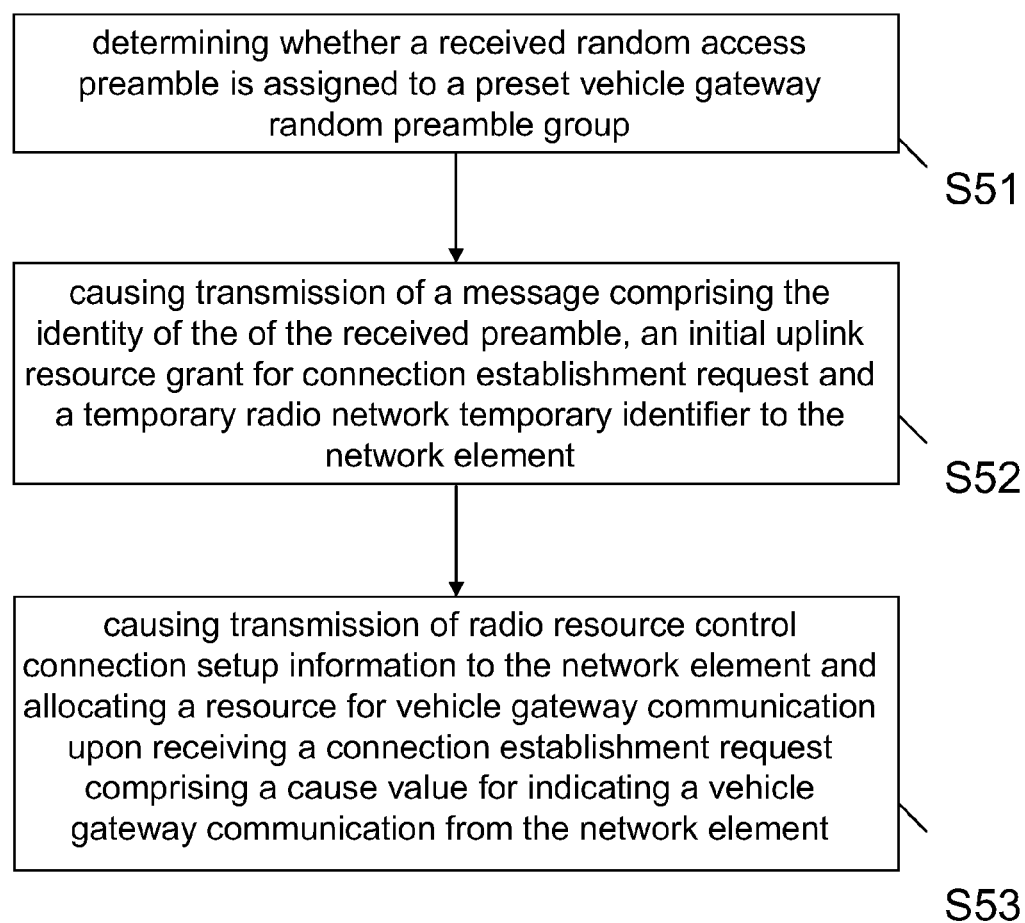
FIG. 5 shows a principle flowchart of an example for a method according to certain embodiments of the present invention.

FIG. 5 shows a principle flowchart of an example for a method according to certain embodiments of the present invention.

In Step S51, it is determined whether a received random access preamble is assigned to a preset vehicle gateway random preamble group.

In Step S52, a transmission of a message comprising the identity of the received preamble, an initial uplink resource grant for connection establishment request and a temporary radio network temporary identifier to the network element is caused.

In Step S53, upon receiving a connection establishment request comprising a cause value for indicating a vehicle gateway communication from the network element, transmission of radio resource control connection setup information to the network element is caused and a resource for vehicle gateway communication is allocated.

Figure 6:
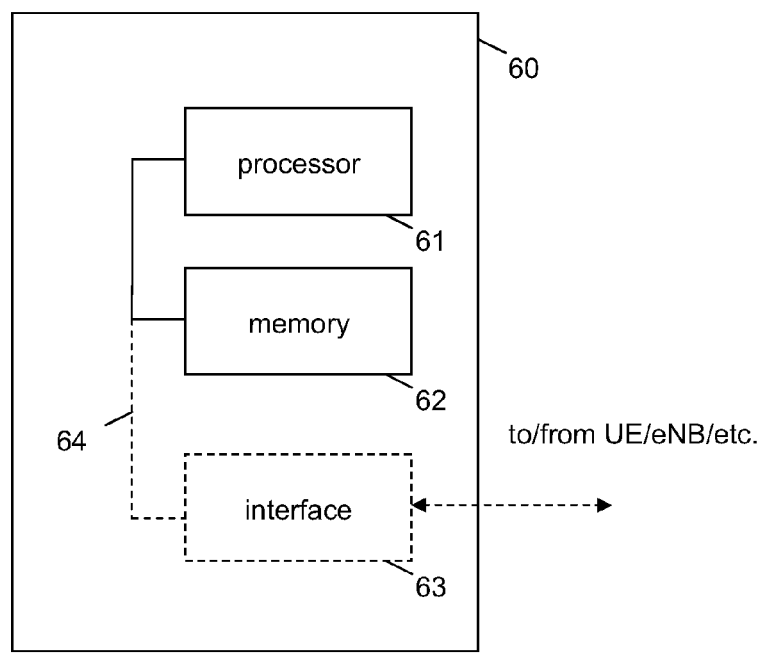
FIG. 6 shows a principle configuration of an example for an apparatus according to certain embodiments of the present invention.

FIG. 6 shows a principle configuration of an example for an apparatus according to certain embodiments of the present invention. The apparatus 60 comprises at least one processor 61 and at least one memory 62 including computer program code, which are connected by a bus 64 or the like. As indicated with a dashed line in FIG. 4, an interface 63 may optionally be connected to the bus 64 or the like, which may enable communication e.g. to/from a user equipment, a network entity, a base station, or the like. The at least one memory and the computer program code are arranged to, with the at least one processor, cause the apparatus at least to perform causing transmission of a random access preamble which is assigned to a preset vehicle gateway random preamble group to a base station, and, upon receiving a message comprising the identity of the of the transmitted preamble, an initial uplink resource grant for connection establishment request and a temporary radio network temporary identifier from the base station, causing a transmission of a connection establishment request comprising a cause value for indicating a vehicle gateway communication to the base station.

Figure 7:
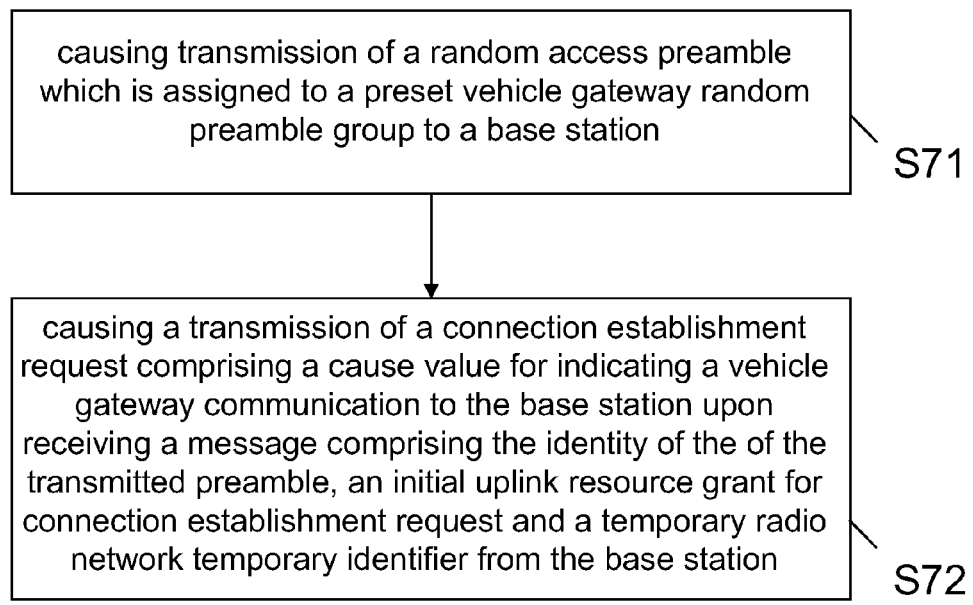
FIG. 7 shows a principle flowchart of an example for a method according to certain embodiments of the present invention.

FIG. 7 shows a principle flowchart of an example for a method according to certain embodiments of the present invention.

In Step S71, a transmission of a random access preamble which is assigned to a preset vehicle gateway random preamble group to a base station is caused.

In Step S72, upon receiving a message comprising the identity of the of the transmitted preamble, an initial uplink resource grant for connection establishment request and a temporary radio network temporary identifier from the base station, a transmission of a connection establishment request comprising a cause value for indicating a vehicle gateway communication to the base station is caused.

According to certain embodiments of the present invention, a dedicated Vehicle GW random preamble VG-RAP is defined to serve the vehicle GW access to the network in order to resolve the contention during the initial access and thus decrease access latency. In addition to that, the maximum random preamble transmission density may be defined for vehicle GW communication to ensure that vehicle GW can send the random preamble in every possible sub-frame.

According to certain embodiments of the present invention, a new cause value Vehicle GW originated data/signaling for the RRC connection establishment request is defined to inform the network that the coming data traffic is from the vehicle communication. Upon receiving the vehicle GW originated data/signaling cause value, the eNB shall prepare semi-persistent resource for vehicle communications. In addition, according to certain embodiments of the present invention, an 'ExplicitReleaseAfter' indication is defined for semi-persistent resource allocation releasing if N consecutive erroneous packets are handled. As example, N could be configurable by the network. Moreover, according to certain embodiments of the present invention, the eNB scheduler shall give the high priority to the vehicle GW for achieving the same QoS parameters also with legacy UEs.

According to certain embodiments of the present invention, during the handover procedure, the source eNB shall inform the target eNB that cause value of Vehicle GW originated data/signaling in a feasible format in the Handover Request. The dedicated VG-RAP shall always be used by vehicle GW.

All the mentioned embodiments can be formed in several alternatives as illustrated but not limited to the implementation examples shown below.

Hereinafter, description of an exemplary implementation of enhanced RRC connection establishment procedure and handover procedure to enable the fast connection setup for vehicle GW communication according to certain embodiments of the present invention is provided.

Initial Access to the Network

When a vehicle GW enters the network or to be elected, the RRC connection setup is needed at the $1^{st}$ step in order to transfer the data between the vehicle GW UE and eNB.

Figure 8:
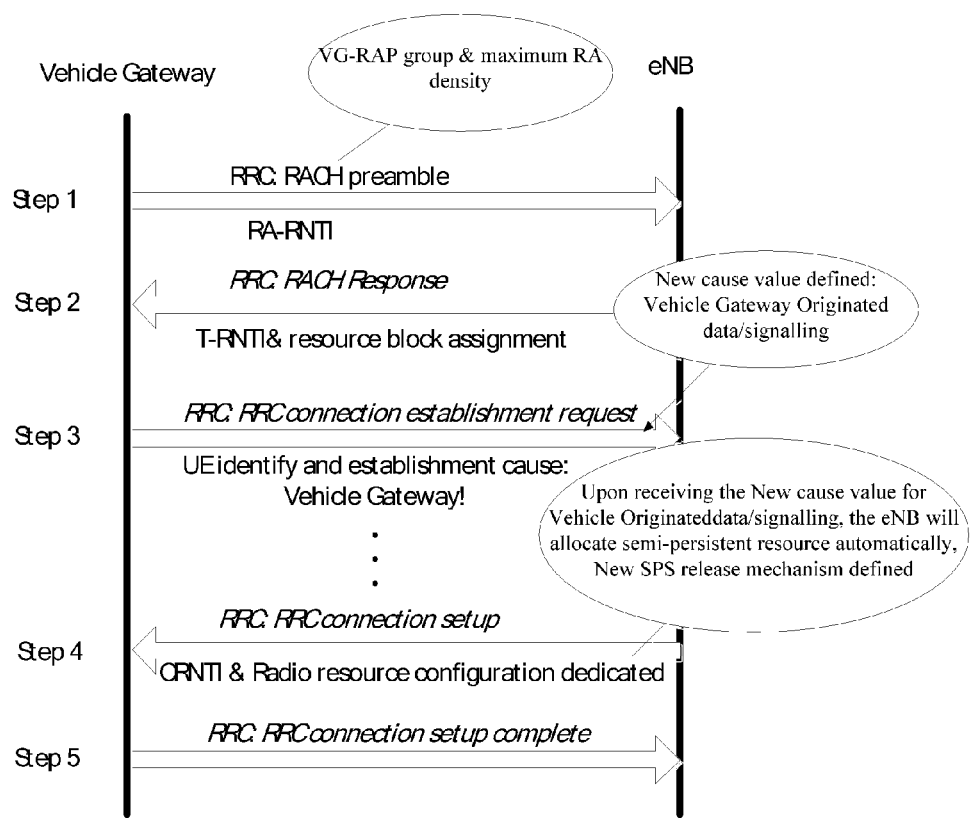
FIG. 8 shows a RRC connection setup for Vehicle Communication according to certain embodiments of the present invention.

FIG. 8 shows a RRC connection setup for Vehicle Communication according to certain embodiments of the present invention. In order to illustrate the enhanced connection setup procedure, it is started from the RACH procedure as the RRC connection setup is part of the RACH procedure as illustrated in FIG. 8.

Step 1: According to certain embodiments of the present invention, when a vehicle gateway needs to set up connection with network, the vehicle gateway shall send a preamble signature which is typically randomly chosen by the vehicle mobile gateway. Hence it is very possible for more than one vehicle gateway or other legacy UEs simultaneously to transmit the same signature. If this occurs, it will lead to a need for a subsequent contention resolution process. Consequently, this extra process introduces the longer delay for the access. For solving this problem, a specific vehicle gateway random pre-amble group (VG-RAP) is defined. That's the legacy UE and the vehicle GW shall have the different group of the random preamble signatures.

In addition to that, according to the current specification, the random preamble access configuration is sent in the SIB2 (System Information Block) and the density of the random preamble transmission is configurable by the network in a cell. Typically, there will be multiple random access opportunities in one radio frame. In order to make sure that the vehicle GW could send a specific RACH preamble whenever needed, according to certain embodiments of the present invention, the systems is designed to allow the vehicle GW sending the VG-RAP in every sub-frame. Therefore, though in the broadcasted system information, the random access opportunities might be configured as multiple times in a radio frame for legacy UE. Still the Vehicle GW may have the default right to send the random access preamble in every sub-frame, e.g., Index 14 for frame type 1 as in Table 5.7.1.2 of [6]. Thus, according to certain embodiments of the present invention, the default setting for the vehicle GW's random access density may be maximum RACH density for the frame type 1 and frame type 2 in FDD and TDD system, respectively.

Step 2: Upon receiving the VG-RAP from vehicle GW, according to certain embodiments of the present invention, the eNB sends a RACH response which conveys the identity of the detected preamble, an initial uplink resource grant for transmission of the Step 3 message, and an assignment of a Temporary Radio Network Temporary Identifier (T-RNTI) (which may or may not be made permanent as a result of the next step—contention resolution).

Step 3: According to certain embodiments of the present invention, the vehicle GW may feedback with RRC connection establishment message when receiving RACH response from eNB. In this RRC connection request message, the new cause value for the establishment could be Vehicle GW originating data, which is designated to indicate the vehicle gateway communication.

Step 4: Upon receiving the RRC connection establishment request with cause value of Vehicle GW originating from vehicle GW, according to certain embodiments of the present invention, the eNB shall reply with the C-RNTI and Radio Resource Configuration Dedicated in the RRC connection setup message.

For example, the RRC connection setup message contains configuration information for SRB 1. This allows subsequent signaling to use the DCCH logical channel. The eNB can instruct the vehicle GW to apply a default configuration for SRB 1, or it can instruct the vehicle GW to apply a specific configuration. The default configuration for SRB 1 is specified by 3GPP within TS 36.331. Using the default configuration helps to reduce the signaling overhead. The SRB 1 always uses the acknowledged mode RLC.

The RRC connection setup message can also define configuration information for the PDSCH, PUCCH and PUSCH physical channels. It can also include information regarding uplink power control, CQI reporting, the sounding reference signal, antenna configuration and scheduling requests etc. There are two ways to allocate the resource for the vehicle GW communication:

Dynamic resource allocation

Semi-persistent resource allocation

Typically, the dynamic resource allocation not only increases the signaling overhead in both uplink and downlink, but also introduces the extra delay which is not favored by the vehicle communications though it is an resource efficient method. Therefore, according to certain embodiments of the present invention, semi-persistent resource allocation would be a very promising option for the vehicle GW communications. Thus, as example, the eNB shall allocate the Semi-Persistent resource in the coming scheduling period for the vehicle GW communications upon receiving the RRC connection establishment request message with Vehicle GW originating cause value. By doing that vehicle GW does not need to wait for the resource grant from eNB for every transmission. In addition, the eNB scheduler may give the higher priority to the Vehicle GW for the same QoS parameters during the resource allocation if the cause value of Vehicle GW originating.

According to certain embodiments of the present invention, the uplink SPS configuration of IE SPS-config, which is used to specify the semi-persistent scheduling configuration includes: Semi-Persistent Scheduling C-RNTI; Uplink Semi-Persistent Scheduling interval semiPersistSchedIntervalUL and number of empty transmissions before implicit release implicitReleaseAfter if Semi-Persistent Scheduling is enabled for the uplink;

sions and so on. When the number of empty transmissions exceeds the value defined in implicitReleaseAfter, the SPS allocation is automatically released. Besides the implicitReleaseAfter, explicit releasing by RRC message is another conventional method.

Based on the characteristics of the vehicle GW environment, the vehicle gateway may be moving along a track with a considerable changing velocity. Thus the vehicle GW might be easily lost connection with its subordinates or with eNB. In order not to occupy the unnecessary uplink resource, according to certain embodiments of the present invention, the SPS should be released for other potential usage when the allocated resource does not serve the vehicle GW well enough due to the link problem as an example.

According to certain embodiments of the present invention, such ExplicitReleaseAfter could be defined; and the ExplicitReleaseAfter indicates the number of consecutive erroneous packets in the uplink and ExplicitReleaseAfter=ENUMERATED {e2, e3, e4, e8, eN} where the e2 corresponds 2 consecutive erroneous packets and eN corresponds N consecutive erroneous packets.

Step 5: Upon receiving an RRC Connection Setup message, according to certain embodiments of the present invention, the UE stops the T300 timer and makes the transition to RRC Connected mode. The UE then proceeds to complete the procedure by sending an RRC Connection Setup Complete message.

With the above enhanced initial connection Step 1, 3 and 4 for vehicle GW according to the present invention, the contention rate, the resource allocation latency could be decreased. Moreover, the resource usage for semi-persistent scheduling method could be improved.

Enhanced Handover Procedure Between the LTE eNBs

When a vehicle GW moves along the road with considerable velocity, the handover HO between the eNBs will occur. How to enable the vehicle GW accessing the target eNB is a very important issue for seamless connection. The above proposed points can also be applied to enhance the handover procedure for vehicle GW for fast and seamless handover.

The intra E-UTRAN HO in RRC_CONNECTED state is UE assisted NW controlled handover, with handover prepa-

```
SPS-ConfigUL ::=    CHOICE {
    release                         NULL,
    setup                           SEQUENCE {
        semiPersistSchedIntervalUL      ENUMERATED {
                                            sf10, sf20, sf32, sf40, sf64, sf80,
                                            sf128, sf160, sf320, sf640, spare6,
                                            spare5, spare4, spare3, spare2,
                                            spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }       OPTIONAL,                                   -- Need OP
        twoIntervalsConfig              ENUMERATED {true}   OPTIONAL, --
Cond TDD
        ...
    }
}
```

The 'implicitReleaseAfter' indicates the number of empty transmissions before implicit release. Value e2 corresponds to 2 transmissions, e3 corresponds to 3 transmisration signaling in E-UTRAN. Part of the HO command comes from the target eNB and is transparently forwarded to the UE by the source eNB. Both the source eNB and Vehicle GW keep some context (e.g. C-RNTI) to enable the return of the UE in case of HO failure.

Figure 9:
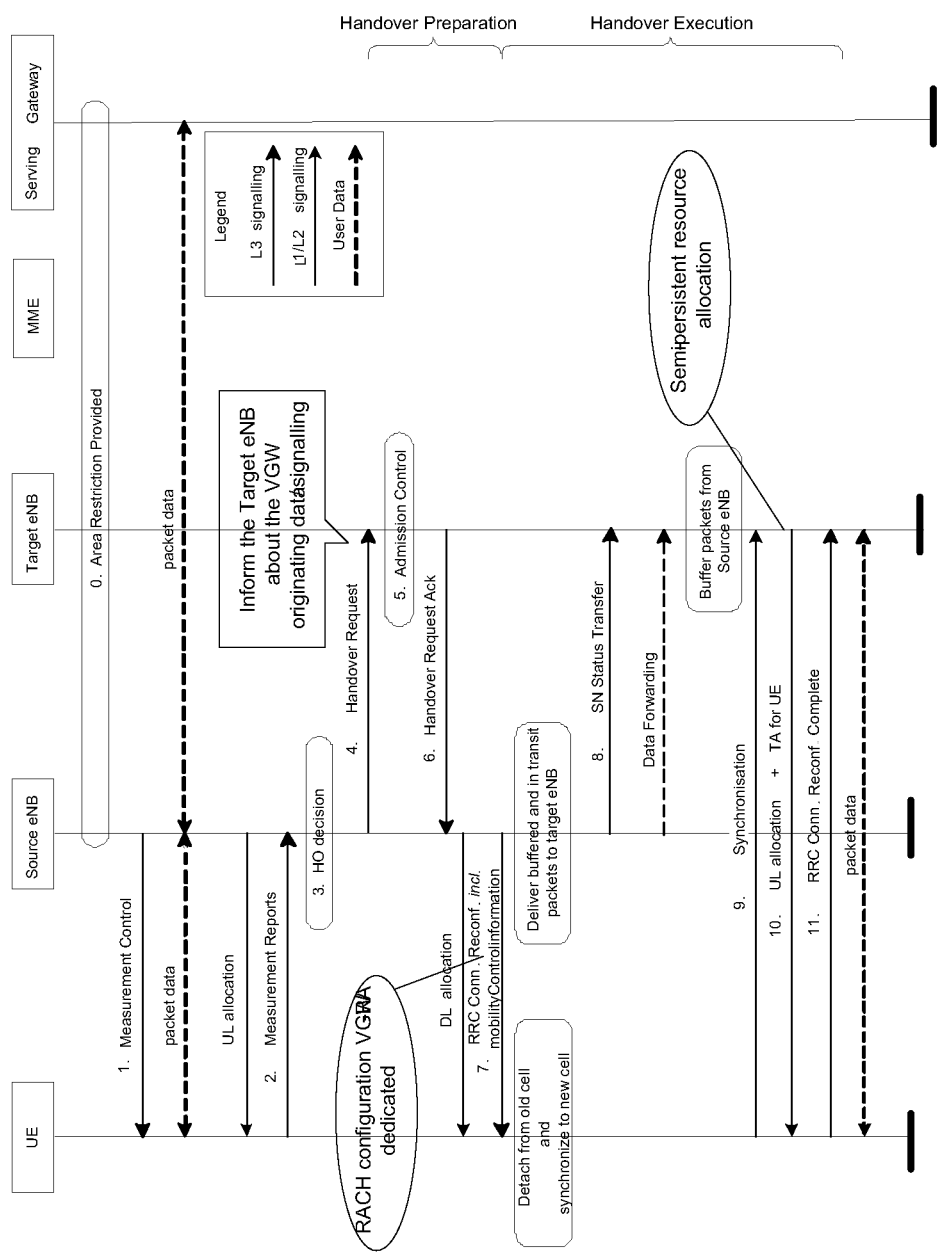
FIG. 9 shows enhanced handover procedures for Vehicle communications according to certain embodiments of the present invention.

The enhanced handover procedure for vehicle communication according to certain embodiments of the present invention is illustrated in FIG. 9 and explained hereafter.

Step 1: Measurement control/report (message0/1): The source eNB controls and triggers the vehicle GW measurement procedures and Vehicle GW sends the measurement report message to eNB.

Step 2: Handover decision (message2/3): The source eNB performs the handover decision based on the received measurement report message from vehicle GW.

Step 3: Handover Request (message4): The source eNB issues a HANDOVER REQUEST message in X2 interface to the target eNB passing necessary information to prepare the HO at the target side. Typically, HANDOVER REQUEST message includes the bearers to be setup by target eNB. In this message, the cause value for RRC connection establishment request message, e.g. Vehicle GW originating data shall be included in any feasible indication format so the target eNB is aware of the purpose of the type of the handover object and thus could make the proper HO preparation.

Step 4: Admission Control (message5): Admission Control may be performed by the target eNB. If the resources can be granted by target eNB, the target eNB configures the required resources, e.g, semi-persistent resource and reserves a C-RNTI and a VG-RAP preamble.

Step 5 (message6): Target eNB prepares HO with L1/L2 and sends the HANDOVER REQUEST ACKNOWLEDGE to the source eNB. The HANDOVER REQUEST ACKNOWLEDGE message shall include a dedicated VG-RAP for vehicle GW intra-SUTRA handover, and possibly some other parameters i.e. access parameters, SIBs, etc.

Step 6 (message7): The target eNB generates the RRC message to perform the handover, i.e RRCConnectionReconfiguration message including the mobilityControlInformation, to be sent by the source eNB towards the UE. In this RRCConnectionReconfiguration message, the dedicated VG-RAP shall be included in the mobilityControlInformation.

Step 7 to 8: The descriptions thereof are omitted due to being irrelevant for understanding the present embodiment of the invention.

Step 9 (message9): After receiving the RRCConnectionReconfiguration message including the mobilityControlInformation, Vehicle GW performs synchronisation to target eNB and accesses the target cell via a dedicated random access preamble transmission.

Step 10 (message10): The target eNB responds with semi-persistent UL resource allocation and timing advance.

Step 11 (message11): When the Vehicle GW has successfully accessed the target cell, the Vehicle GW sends the RRCConnectionReconfigurationComplete message (C-RNTI) to confirm the handover, along with an uplink Buffer Status Report to the target eNB to indicate that the handover procedure is completed for the vehicle GW. With the above enhanced handover steps 3, 4, 5, 6, 9, 10 which are the embodiment of the proposed points, the intra-ETURA handover procedure performance could be improved in terms of the resource allocation latency and contention rate etc.

On the other hand, if the cellular function in this vehicle is not utilized for the vehicle GW purpose, according to certain embodiments of the present invention, the normal RRC connection setup and handover procedure may be adopted.

In the foregoing exemplary description of the apparatus, only the units that are relevant for understanding the principles of the invention have been described using functional blocks. The apparatuses may comprise further units that are necessary for its respective function. However, a description of these units is omitted in this specification. The arrangement of the functional blocks of the apparatuses is not construed to limit the invention, and the functions may be performed by one block or further split into sub-blocks.

According to exemplarily embodiments of the present invention, a system may comprise any conceivable combination of the thus depicted devices/apparatuses and other network elements, which are arranged to cooperate as described above.

Embodiments of the present invention may be implemented in software, hardware, application logic or a combination of software, hardware and application logic. The software, application logic and/or hardware generally, but not exclusively, may reside on the devices' modem module. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under LTE, LTE-A, WCDMA, WIMAX and WLAN and can advantageously be implemented in user equipments or smart phones, or personal computers connectable to such networks. That is, it can be implemented as/in chipsets to connected devices, and/or modems thereof.

According to the present invention, user equipment may refer to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense.

Rather, there are several variations and modifications which may be made without departing from the scope of the present invention as defined in the appended claims.

The following meanings for the abbreviations used in this specification apply:
eNB Evolved Node B
UE User Equipment
LTE Long Term Evolution
EUTRAN Evolved Universal Terrestrial Radio Access Network
CCCH Common Control Channel
DSRC Dedicated Short Range Communication
GW Gateway
MTC Machine Type Communication
NAS Non-Access Stratum
QoS Quality of Service
RACH Random Access Channel
RNTI Radio Network Temporary Identifier
RRC Radio Resource Control
RSU Road Side Unit
SCH Shared Channel
SIB System Information Block
SRB Signaling Radio Bearer
V2V Vehicle to Vehicle
WAVE Wireless Access for the Vehicular Environment
WLAN Wireless Local Area Network
IEEE Institute of Electrical and Electronics Engineers
RRC Radio Resource Control
RRM Radio Resource Management

What is claimed is:

1. An apparatus, comprising:
   circuitry for vehicular communication, the circuitry configured to
      determine whether a received random access preamble is assigned to a preset vehicle gateway random preamble group;
      transmit, to a network element, a message comprising an identity of the received random access preamble, an initial uplink resource grant for connection establishment request and a temporary radio network temporary identifier;
      transmit, after receiving a connection establishment request from the network element, radio resource control connection setup information to the network element, the connection establishment request including a cause value for indicating vehicle-to-vehicle (V2V) communication; and
      allocate, after transmission of the radio resource control setup information to the network element, a resource for the V2V communication.

2. The apparatus according to claim 1, wherein the circuitry allocates the resource for the V2V communication by semi-persistent resource allocation or by dynamic resource allocation.

3. The apparatus according to claim 1, wherein when the circuitry receives information that a preset number of consecutive erroneous data packet transmissions is exceeded, the circuitry is configured to release the resource.

4. The apparatus according to claim 1, wherein the circuitry is configured to set a priority of scheduling the V2V communication to be higher than non-V2V communication.

5. The apparatus according to claim 1, wherein the circuitry is configured to set a random access preamble density of the preset vehicle gateway random preamble group to a value which enables transmission of the random access preamble in each available sub-frame or a possible maximum random access channel density that is available.

6. The apparatus according to claim 1, wherein
   the circuitry is configured to transmit, when deciding whether to initiate a handover based on a measurement report message received from the network element, a handover request to a target base station including the cause value for indicating a vehicle gateway communication, and
   the target base station allocates a resource for the V2V communication based on the handover request.

7. The apparatus according to claim 1, wherein the network element is a vehicle gateway provided at a vehicle or a user equipment.

8. The apparatus according to claim 1, wherein the apparatus is a base station or a road side unit.

9. The apparatus according to claim 1, wherein the apparatus is operating according to the long-term evolution or according to the long-term evolution advanced.

10. A method, comprising
    determining, by circuitry, whether a received random access preamble is assigned to a preset vehicle gateway random preamble group;
    transmitting, by the circuitry to a network element, a message comprising an identity of the received random access preamble, an initial uplink resource grant for connection establishment request and a temporary radio network temporary identifier;
    transmitting, by the circuitry after receiving a connection establishment request from the network element, radio resource control connection setup information to the network element, the connection establishment request including a cause value for indicating vehicle-to-vehicle (V2V) communication; and
    allocating, by the circuitry after transmission of the radio resource control setup information to the network element, a resource for the V2V communication.

11. The method according to claim 10, wherein the allocating the resource is performed by semi-persistent resource allocation or by dynamic resource allocation.

12. The method according to claim 10, further comprising releasing the resource when the circuitry receives information that a preset number of consecutive erroneous data packet transmissions is exceeded.

13. The method according to claim 10, further comprising setting, by the circuitry, a priority of scheduling the V2V communication to be higher than non-V2V communication.

14. The method according to claim 10, further comprising setting, by the circuitry, a random access preamble density of the preset vehicle gateway random preamble group to a value which enables transmission of the random access preamble in each available sub-frame or a possible maximum random access channel density that is available.

15. The method according to claim 10, further comprising transmitting, when deciding whether to initiate a handover based on a measurement report message received from the network element, a handover request to a target base station including the cause value for indicating a vehicle gateway communication, wherein the target base station allocates a resource for the V2V communication based on the handover request.

16. The method according to claim 10, wherein the network element is a vehicle gateway provided at a vehicle or a user equipment.

17. The method according to claim 10, wherein the method is carried out in a base station or a road side unit.

18. The method according to claim 10, wherein the method is carried out according to the long-term evolution or according to the long-term evolution advanced.

19. An apparatus, comprising:
    circuitry for a vehicle that performs vehicle-to-vehicle (V2V) communication, the circuitry configured to
        transmit a random access preamble, which is assigned to a preset vehicle gateway random preamble group, to a base station; and
        transmit a connection establishment request, after receiving a message comprising an identity of the transmitted random access preamble, an initial uplink resource grant for connection establishment request and a temporary radio network temporary identifier from the base station, the connection establishment request comprising a cause value for indicating vehicle gateway communication between a vehicle gateway and the base station.

20. The apparatus according to claim 19, wherein the apparatus is the vehicle gateway provided at the vehicle.

* * * * *